Patented Jan. 15, 1946

2,393,000

UNITED STATES PATENT OFFICE 2,393,000

PROCESS OF PREPARING ALKOXY PROPIONYL COMPOUNDS

Nelson V. Seeger, Cuyahoga Falls, Ohio, assignor to Wingfoot Corporation, Akron, Ohio, a corporation of Delaware No Drawing. Application July 24, 1943, Serial No. 496,079

4 Claims. (Cl. 260—464)

This invention relates to a new chemical process in which an alkyl radical of an alkyl-ether radical is exchanged for or replaced by R—O— of an hydroxylate ROH which hydroxylate is higher boiling than the hydroxylate of the replaced ether radical and in which R may be alkyl, aryl or aralkyl. The exchange may take place in a beta-alkoxy propionate or a beta-alkoxy propionitrile or an alpha-halogen, alkyl or aryl substitution derivative thereof. The ester-forming radical of any such propionate may simultaneously be exchanged for the alkyl or aralkyl radical for which the ether radical is exchanged. The invention includes also the similar exchange of the ether radical of beta-alkoxy propionic acids and beta-alkoxy propionamides and beta-alkoxy propionic salts of sodium and beta-alkoxy propionic acid anhydrides (including alpha-halogen, alkyl, and aryl substitution derivatives thereof) in which the alkyl-ether radical is exchanged for or replaced by R of an hydroxylate ROH which hydroxylate is higher boiling than the hydroxylate of the replaced ether radical and in which R may be alkyl, aryl or aralkyl, but esterification accompanies such ether exchange, producing the corresponding alkyl, aralkyl or aryl propionate in all cases except in those cases where a nitrile or a salt is used as the starting material.

In order to bring about the ether exchange, the alkoxy group should be a lower member of the series. The corresponding alcohol should not boil above around about 150° C. It may be methyl, ethyl, propyl, butyl or amyl. On the other hand, R may be alkyl, aryl or aralkyl. Its hydroxylate has a higher boiling point than that of the hydroxylated alkyl formed from the alkoxy group. For example, it is possible to convert a methoxy compound of the types referred to above to the corresponding ethoxy or butoxy or phenoxy or benzyloxy compound. If R is aryl or aralkyl, ROH should not boil above about 200 or 225° C. Higher boiling compounds may be used in carrying out the reaction, but the process would not then ordinarily be commercially satisfactory.

An acrylic compound results on removal of the alkoxy group from the starting material. This compound which is an intermediate compound in this reaction should have a boiling point at least about as high as that of the ROH corresponding to the replaced alkoxy group. For instance, when $CH_3O.C_2H_4.COOCH_3$ is heated with an alkaline catalyst, there is a tendency for methyl alcohol to split off, leaving methyl acrylate. The boiling point of methyl acrylate is about 80° C. while the boiling point of methyl alcohol is 65° C. But when the methoxy ester is heated with ethyl alcohol, methyl alcohol which splits off is volatilized without substantial loss of either ethyl alcohol or methyl acrylate, both of which are higher boiling than methyl alcohol. In this way, the methyl group is replaced by the ethyl group.

However, butyl alcohol cannot be split off of methyl-beta-n-butoxy propionate and be replaced by a higher boiling alcohol because the intermediate, methyl acrylate (B. P. 80.3° C.), boils at a lower temperature than n-butyl alcohol (B. P. 117° C.). However, n-butyl-beta-n-butoxy propionate may be obtained by effecting the ether exchange with n-butyl-beta-methoxy propionate instead of the methyl ester. This is possible because the acrylate formed during such an exchange is n-butyl acrylate (B. P. 144° C.) which is higher boiling than both methyl alcohol (B. P. 65° C.) and n-butyl alcohol (B. P. 117° C.).

In order to bring about the ether exchange, an alkaline catalyst is employed; such as, for example, sodium methylate, potassium methylate, sodium hydroxide, potassium hydroxide, benzyl trimethyl ammonium hydroxide (known as "Triton B") or the alcoholates or hydroxides formed by the use of metallic magnesium, aluminum, sodium or calcium, etc., in an alcohol or water solution.

In carrying out the ether exchange of this invention, it is, therefore, necessary to use an alkaline catalyst and an alcohol of higher boiling point than the alcohol formed from the alkoxy group. Furthermore, the intermediate compound resulting from the starting material, after removal of the alkoxy group, must have a boiling point above that of the alcohol removed.

The following examples illustrate the invention:

Example 1

One mol (160 grams) of n-butyl-beta-methoxy propionate and 4 mols (432 grams) benzyl alcohol were refluxed with 10 grams $NaOCH_3$ under a total reflux-partial take-off reflux head. Benzyl-beta-benzyloxy propionate was produced. B. P. 222–227/9 mm. $N_D^{28}$ 1.5338. $D_{15}^{25}$ 1.0952. Saponification number (found) 209, (calcd.) 208.

Benzyl-beta-benzyloxy propionate was obtained when 76 grams of methyl-beta-benzyloxy propionate were refluxed with 170 grams of benzyl alcohol, using 5 grams $NaOCH_3$ as catalyst. In this case, only ester exchange could occur.

Example 2

One mol (118 grams) methyl-beta-methoxy propionate, 290.5 grams (5 mols) allyl alcohol, and 5 grams sodium (dissolved in the allyl alcohol) were refluxed 4 hours, and then the methyl alcohol was removed slowly with a 40-inch packed column. Sixty and five-tenths grams of methyl alcohol were received. The catalyst was then destroyed with 8 grams gaseous HCl and the solution distilled. After removing the excess allyl alcohol, the allyl-beta-allyloxy propionate obtained distilled at 90–96/14 mm. $N_D^{26}$ 1.4388. $D_{15}^{26}$ 0.9736. Saponification number (found) 329, 325 (theory) 330. This ester polymerizes slowly to a very viscous syrup after heating 2 days at 100° C. in the presence of a small amount of benzoyl peroxide.

*Example 3*

One mol of beta-methoxy isobutyronitrile, 5 mols of allyl alcohol, and 5 grams of sodium (dissolved in the allyl alcohol) were refluxed 4 hours and then the methyl alcohol removed slowly with a 40-inch packed column. The catalyst was then destroyed with gaseous HCl and the solution distilled. The desired beta-allyloxy isobutyronitrile was obtained.

The following table illustrates other ether-exchange reactions:

| Starting material | ROH | End product |
|---|---|---|
| $CH_3OC_2H_4COOCH_3$ | $C_4H_9OH$ | $C_4H_9OC_2H_4COOC_4H_9$ |
| $CH_3OC_2H_4COOCH_3$ | $CH_2\text{:}CHCH_2OH$ | $CH_2\text{:}CH.CH_2OC_2H_4COOCH_2.CH\text{:}CH_2$ |
| $CH_3OC_2H_4COOCH_3$ | $C_6H_5CH_2OH$ | $C_6H_5CH_2OC_2H_4COOCH_2C_6H_5$ |
| $CH_3OC_2H_4COOCH_3$ | $C_6H_5OH$ | $C_6H_5OC_2H_4COOC_6H_5$ |
| $CH_3OCH_2.CH(CH_3).COOCH_3$ | $C_3H_5OH$ | $C_3H_5OCH_2.CH(CH_3).COOC_3H_5$ |
| $CH_3OC_2H_3ClCOOCH_3$ | $C_3H_5OH$ | $C_3H_5OCH_2CHClCOOC_3H_5$ |
| $CH_3OCH_2.CH(.OC_2H_5).COOCH_3$ | $C_3H_5OH$ | $C_3H_5OCH_2.CH(.OC_2H_5).COOC_3H_5$ |
| $CH_3OCH_2.CHCl.CN$ | $C_4H_9OH$ | $C_4H_9OCH_2.CHCl.CN$ |
| $CH_3OCH_2CH(CH_3).CONH_2$ | $C_4H_9OH$ | $C_4H_9OC_2H_2.CH(CH_3).COOC_4H_9$ |
| $CH_3OCH_2.CH(CH_3).CN$ | $C_4H_9OH$ | $C_4H_9OCH_2.CH(CH_3).CN$ |
| $CH_3OCH_2CH_2CONH_2$ | $C_4H_9OH$ | $C_4H_9OCH_2CH_2COOC_4H_9$ |
| $CH_3OC_2H_4COONa$ | $C_3H_5OH$ | $C_3H_5OC_2H_4COONa$ |
| $CH_3OCH_2.C(CH_3)COONa$ | $C_3H_5OH$ | $C_3H_5OCH_2.C(CH_3)COONa$ |
| $(CH_3.O.C_2H_4.C\text{:}O)_2O$ | $C_4H_9OH$ | $C_4H_9.O.C_2H_4.COOC_4H_9$ |
| $CH_3OC_2H_4COOCH_3$ | $HOC_2H_4OH$ | $HOC_2H_4OC_2H_4COOC_2H_4OH$ Or the polyester-polyether $(-OC_2H_4OC_2H_4COOC_2H_4O-)_x$ |

What I claim is:

1. The process of producing a beta alkoxy propionyl compound by means of an ether exchange which comprises heating in the presence of an alkaline catalyst (1) an alkoxy compound of the class consisting of beta-alkoxy propionates and beta-alkoxy propionitriles in which the alkoxy group contains no more than five carbon atoms, said alkoxy compound being converted into an alcohol and an acrylic compound when heated in the presence of said alkaline catalyst, and (2) a compound having the formula ROH in which R is from the class consisting of alkyl, aralkyl, and aryl hydrocarbon radicals, the boiling point of the alcohol being lower boiling than both ROH and the acrylic compound to such a temperature that the alcohol is volatilized without substantial loss of the ROH or said acrylic compound and until the desired beta alkoxy propionyl compound is formed.

2. The process of producing a beta alkoxy propionitrile by means of an ether exchange which comprises heating in the presence of an alkaline catalyst beta-alkoxy propionitrile containing not more than five carbon atoms in the alkoxy group, said alkoxy compound being converted into an alcohol and an acrylonitrile when heated in the presence of said alkaline catalyst, with a compound having the formula ROH in which R is from the class consisting of alkyl, aralkyl, and aryl hydrocarbon radicals, the alcohol boiling at a lower temperature than both ROH and the acrylonitrile to such a temperature that alcohol is volatilized without substantial loss of the ROH or said acrylonitrile and until the desired beta-alkoxy propionitrile is formed.

3. The process of producing a beta alkoxy propionate by means of an ether exchange which comprises heating in the presence of an alkaline catalyst a beta-alkoxy propionate containing no more than five carbon atoms in the alkoxy group, said alkoxy compound being converted into an alcohol and an acrylate when heated in the presence of said alkaline catalyst, with a compound having the formula ROH in which R is from the class consisting of alkyl, aralkyl, and aryl hydrocarbon radicals, the boiling point of the alcohol being lower than the boiling point of ROH and the acrylate to such a temperature that the alcohol is volatilized without substantial loss of the ROH or acrylate and until the desired beta alkoxy propionate is formed.

4. The process of producing a beta alkoxy propionate of the formula R"OC$_2$H$_4$COOR' by means of an ether and ester exchange process which involves heating in the presence of an alkaline catalyst an alkoxy propionate of the formula R.O.C$_2$H$_4$.COOR', said alkoxy propionate being converted into an alcohol having the formula ROH and R'OH and an acrylate when heated in the presence of said alkaline catalyst, with R"OH in which R and R' are alkyl groups and R" is an alkyl radical, the boiling point of ROH and R'OH being less than the boiling point of R"OH and the acrylate to such a temperature that ROH and R'OH are volatilized without substantial loss of R"OH or the acrylate and until the desired beta-alkoxy propionate is formed.

NELSON V. SEEGER.